United States Patent [19]

Niemann

[11] 4,096,046
[45] Jun. 20, 1978

[54] METHOD AND APPARATUS FOR THE SEPARATION OR ENRICHMENT OF ISOTOPES

[75] Inventor: Hans-Joachim Niemann, Erlangen, Germany

[73] Assignee: Kraftwerk Union Aktiengesellschaft, Mulheim (Ruhr), Germany

[21] Appl. No.: 676,490

[22] Filed: Apr. 13, 1976

[30] Foreign Application Priority Data

Apr. 22, 1975 Germany .............................. 2517828

[51] Int. Cl.$^2$ ................................................ B01J 1/10
[52] U.S. Cl. .......................... 204/157.1 R; 204/163 R; 250/527; 204/DIG. 11
[58] Field of Search ................ 204/157.1 R, DIG. 11; 250/527

[56] References Cited

U.S. PATENT DOCUMENTS

| 3,443,087 | 5/1969 | Robieux et al. ............... 204/157.1 R |
| 3,719,454 | 3/1973 | Shang .......................... 204/DIG. 11 |
| 3,937,956 | 2/1976 | Lyon ..................................... 250/290 |

OTHER PUBLICATIONS

IBM Technical Disclosure Bulletin, vol. 17, No. 11 (April 1975) pp. 3501 & 3502.

Primary Examiner—Howard S. Williams
Attorney, Agent, or Firm—Herbert L. Lerner

[57] ABSTRACT

Method for separation or enrichment of isotopes bound to anisotopic materials and forming a mixture of isotope compounds by irradiating the mixture of isotope compounds with a first light source to photochemically convert the mixture to a second mixture of isotope compounds, e.g. converting $UF_6$ to $UF_5$ and F, irradiating the second mixture in the presence of a reactant with a second light source to selectively excite only one isotope compound of the second mixture, the reactant chemically reacting with the excited compound, e.g. $UF_5 \rightarrow UF_4 + F$ or $UF_5 + R$ (reactant)$\rightarrow UF_4 + RF$ and separating the reaction products including one of the isotopes of the first mixture.

The separation or enrichment of isotopes may be carried out in apparatus having a highly-reflecting elliptical cylinder with a reaction vessel provided with feed and reactant inlet and reaction products outlet, disposed at one focal line of the elliptical cylinder and a high pressure mercury burner disposed at the second focal line, and with the reaction vessel arranged between resonator mirrors of a dye laser as the second light source.

12 Claims, 4 Drawing Figures

METHOD AND APPARATUS FOR THE SEPARATION OR ENRICHMENT OF ISOTOPES

CROSS-REFERENCES TO RELATED APPLICATIONS

In my co-filed U.S. application Ser. No. 676,461, entitled "Method of Separating Isotopes", is disclosed separation of isotopes from a mixture of respective compounds particularly $UF_6$ compounds, involving passing laser radiation having a spectral width maximally corresponding to the width of the isotope shift, through a vaporous mixture of the compounds.

BACKGROUND OF THE INVENTION

1. Field of the Invention

The invention relates to a method and apparatus for the separation or enrichment, with the aid of high-intensity light source, such as lasers, especially, of isotopes which are bound to single-isotope substances and which form therewith a mixture of compounds.

2. Description of the Prior Art

The use of such high-intensity light sources for the separation of isotopes has previously been proposed, for example, in German Published Prosecuted Applications DT-OS No. 1,959,767 and DT-OS No. 2,150,232. The proposals for uranium enrichment contained therein start with uranium hexafluoride, which has a particularly high vapor pressure. By selective excitation of the $U^{235}F_6$ compound, for example, by means of laser light of a frequency which corresponds to a known rotation vibration line of this isotope compound, selective excitation is achieved in such a manner that these excited molecules react with a suitable reaction partner to form another compound. The new compound can then be taken from the mixture of the starting materials by chemical or chemical-physical means. Since the frequency shift between the rotation vibration lines of the uranium isotope compounds is relatively small and there are very many rotation vibration lines, it is difficult to find particularly well suited frequencies.

It is also possible to consider uranium compounds for their suitability with respect to isotope separation by laser beams. For example, it has previously been proposed to use $UCl_6$ or $UF_5Cl$ for this purpose. These compounds, however, have further inherent problems, as the elements bound to the uranium are in themselves not single-isotope elements, i.e., not anisotopic elements. Since there elements possess several isotopes, there are additional rotation lines, which further add to the above mentioned difficulties.

It has therefore been proposed to overcome these difficulties by another starting compound of uranium, which meets the following requirements:

1. it must be gaseous,
2. in addition to uranium, it must contain only such atoms which do not occur in nature as different isotopes, and therefore are single-isotope elements, i.e. anisotopic elements, and
3. the optical absorption spectrum must be such that at least one wavelength is absorbed by one of the two possible uranium compounds predominantly or exclusively.

One suitable uranium compound has now been found to be uranium pentafluoride $UF_5$ which, like $UF_6$, contains only an anisotopic element, besides uranium. However, it has the great disadvantage that it has practically no vapor pressure at room temperature.

SUMMARY OF THE INVENTION

An object of the invention is to provide a method and apparatus for the separation or enrichment of isotopes which are bound to anisotopic elements and form with the latter a mixture of isotope compounds by subjecting the mixture of isotope compounds to a first light source and then to a second light source.

With the foregoing and other objects in view there is provided in accordance with the invention, a method for the separation or enrichment of isotopes which are bound to anisotopic substances and form with the latter a mixture of isotope compounds which comprises the following steps:

a. irradiating said mixture of compounds in gas or vapor form by a first light source to photochemically convert the isotope compounds to another mixture of isotope compounds, b. irradiating said photochemically converted mixture of isotope compounds by a second light source, at a frequency to selectively excite only one compound of said photochemically converted mixture of isotope compounds, c. effecting said excitation in the presence of a reactant which chemically reacts with the excited compound of the mixture to produce a reaction product, and d. separating the reaction products, enriched with one of the starting isotopes.

In accordance with the invention there is provided apparatus for the separation or enrichment of isotopes which are bound to anisotopic substances and form with the latter a mixture of isotope compounds, which comprises a highly-reflecting elliptical cylinder, a tubular irradiation and reaction vessel disposed at one focal line of said reflecting elliptical cylinder, a high pressure mercury burner as a first light source disposed at the second focal line of said reflecting elliptical cylinder, resonator mirrors of a dye laser as a second light source disposed to irradiate a mixture of isotope compounds in said reaction vessel, an inlet to said reaction vessel for introducing a feed mixture of isotope compounds, an inlet to said reaction vessel for introduction of a reactant, and an outlet for said reaction vessel for the discharge of reaction products.

In a further embodiment in accordance with the invention there is provided apparatus for the separation or enrichment of isotopes which are bound to anisotopic substances and form with the latter a mixture of isotope compounds, which comprises a tubular irradiation and reaction vessel, an inlet to said reaction vessel for introducing a feed mixture of isotope compounds, an inlet to said reaction vessel for introduction of a reactant, an outlet for said reaction vessel for the discharge of reaction products, a laser as a first light source with said light directed through said reaction vessel in the axial direction of the vessel, said first light having a frequency at which only the feed material is excited without exciting the resultant reaction product, and resonator mirrors of a dye laser as a second light source disposed to irradiate, in an axial direction through said reaction vessel, the reaction product produced by irradiation from said first light source.

In accordance with the invention, the compound, e.g. $UF_5$, is formed during the irradiation process and is selectively excited and chemically converted before condensation comes about. The method of the invention has the following steps:

a. irradiating the compound mixture by a first light source to convert it photochemically, b. irradiating this new compound mixture by a second light source, preferably a laser, the frequency of which is adjusted so that only one compound of the mixture is selectively excited, c. simultaneously feeding-in a reaction partner for the chemical reaction with the excited compound of the mixture, and d. separating this reaction product, which is enriched with one of the starting isotopes by known methods.

Other features which are considered as characteristic for the invention are set forth in the appended claims.

Although the invention is illustrated and described herein as embodied in a method and apparatus for the separation or enrichment of isotopes, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings.

DESCRIPTION OF THE PREFERRED EMBODIMENTS

Figure 1:
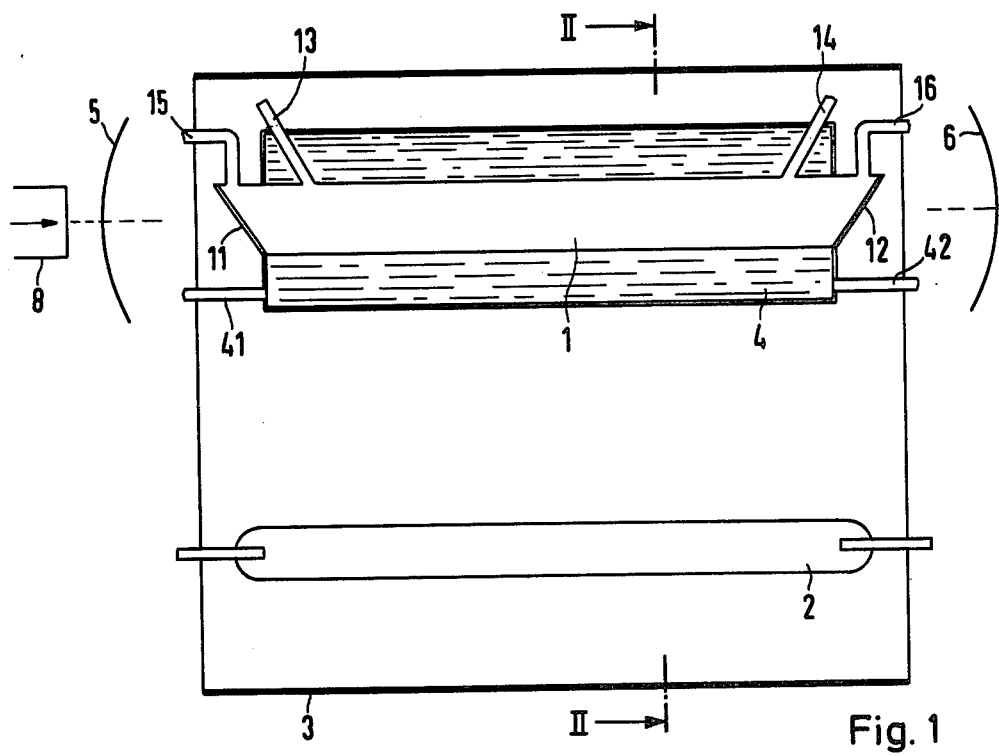
FIG. 1 is a diagrammatic view of the apparatus according to the invention for utilizing the method for separation or enrichment of isotopes.

The method of the invention which is, of course, not limited to the separation of uranium isotopes, is explained by way of example with uranium, since this specific application has particularly great importance.

In the first irradiation step, the starting isotope mixture $UF_6$ is converted into $UF_5$. In the nascent phase, this compound mixture is in gas or vapor form and is subsequently condensed to form a solid substance. It therefore has only a short life. This short life span, however, is sufficient to selectively excite, by further irradiation, one of the two compounds present therein, either $U^{235}F_5$ or $U^{238}F_5$, and to react it chemically with a further reaction partner to form $UF_4$. This compound contains either the uranium 235 isotope or the uranium 238 isotope.

The details of the method and apparatus in accordance with the invention are described with reference to the use of $UF_6$ as the starting isotope mixture, as follows:

1. $UF_6$ is irradiated at temperatures in the order of magnitude of room temperature with light of a wavelength of about 300 nm ($\gamma_1$). The uranium hexafluoride excited thereby, including both compounds $U^{235}F_6$ and $U^{238}F_6$, either splits off a fluorine atom or reacts with an added reaction partner R. In both cases, uranium pentafluoride is produced which is gaseous at the instant of its generation, approximately as per the following functional equations:

$$UF_6 \xrightarrow{hv_1} UF_5 + F \quad (1)$$

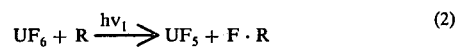

$$UF_6 + R \xrightarrow{hv_1} UF_5 + F \cdot R \quad (2)$$

The process represented in Eq. (1) is also called photodissociation, and need not be selective. To bind the fluorine produced, an intercept reagent must be added, which reactant may be, for example, $H_2$, $CH_4$ or another hydrocarbon. The reaction partners or reactants R named in Eq. (2), consists of partically the same substances. For the performance of the process, however, it is unimportant what the share is of the two named functional cycles, since they arrive at the same final result, which is a short-life $UF_5$.

This reaction product $UF_5$ would condense after a short time, as its equilibrium vapor pressure at room temperature is very low. Within a very short time span, which corresponds to a few molecular collisions, further irradiation, corresponding to process step (b), is now performed with the light of a further source of radiation, for example, a tunable dye laser. The wavelength is adjusted so that it covers and selectively excites only $U^{235}F_5$ or only $U^{238}F_5$. This wavelength is between 100 and 500 nm.

With the light of this radiation source, either predissociation as accomplished according to the following functional relationship:

$$UF_5 + hv_2 \rightarrow UF_4 + F \quad (3)$$

or a reaction of the excited uranium pentafluoride with an added reaction partner is effected in accordance with the following relationships (4) and (5):

$$UF_5 + hv_2 \rightarrow UF_5^* \quad (4)$$

$$UF_5^* + R \rightarrow UF_4 + F \cdot R \quad (5)$$

The reaction partner R binds the nascent fluorine atoms, consisting, for example, of CO, $CO_2$ or $SO_2$. However, the substances named above for the functional equation (2) can also be used.

The reaction product $UF_4$ generated according to the two functional cycles as per Eq. (3) and Eqs. (4) and (5), respectively, is solid. It contains practically only the enriched uranium and can be separated chemically or physically-chemically, such as by dissolving the $UF_5$, present in solid form, in nitric acid, in which $UF_4$ does not dissolve.

Several different types of apparatus may be used to carry out this separation process, some of which will be explained in detail with reference to FIGS. 1 to 4. In the first embodiment, a high-pressure mercury radiator, or arc discharge lamp, specifically with the Hg-lines 313 nm or 366 nm, is used as the first high-intensity light source, and a tunable dye laser is used as the second source of radiation. Hydrogen is used in these examples as the intercept reagent and also as the reaction partner.

Figure 2:
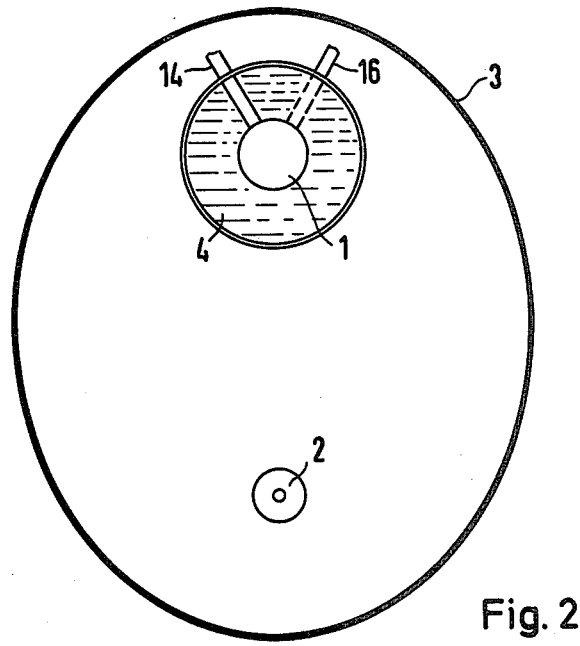
FIG. 2 is an end view of the apparatus of FIG. 1 showing the reaction chamber and a first light source within an elliptical enclosure.

An example of the first embodiment is shown in FIGS. 1 and 2. A tubular reaction vessel, designated as 1, is closed off at both ends by known types of Brewster windows 11 and 12 of calcium fluoride $CaF_2$. This vessel 1 is disposed between two resonator mirrors 5 and 6 for enhancing the radiation from the laser 8. The starting materials, which are the $UF_6$ isotope mixture and the reaction partner $H_2$, are fed-in, and the unreacted portions of these substances, as well as the reaction products HF, $UF_5$ and $UF_4$, are discharged through pipes-tubs 13 and 14. Nitrogen is blown in via the nozzles 15 and 16, to prevent the deposition of solid reaction products, such as $UF_5$ and $UF_4$, on the Brewster windows 11 and 12.

The reaction vessel 1 is surrounded by a liquid filter 4 within a transparent housing. The filter substance consists, for example, of an aqueous solution of salts of nickel and cobalt sulfate, which is fed-in and removed via the stubs 41 and 42. This permits the maintenance of this solution at a constant temperature which is favorable for the filter effect. The reservoir for the filter liquid, as well as appropriate pumps and constant-temperature devices, are not shown for the sake of the clarity of presentation.

The reaction vessel 1 is now located at the point of the focal line of a highly-reflecting elliptical cylinder 3. A broad band high-pressure mercury lamp 2 is disposed at the point of the other focal line to provide the first light source according to the process step a). Through this arrangement, which is shown in cross section in FIG. 2, all the light coming from the high-pressure mercury lamp 2 is concentrated on the irradiation vessel 1 and thus optimally utilized. The filter 4 removes undesired wavelengths and ensures that only that radiation which is required for the conversion of the $UF_6$ can enter into the vessel 1.

The method performed by this apparatus takes place in accordance with the following reaction procedure: The radiation of the high-pressure mercury lamp 2 excites the isotope mixture $UF_6$ and enables the latter to react with the reaction material $H_2$. A mixture of $UF_5$ is formed, as well as hydrogen fluoride and atomic hydrogen. This atomic hydrogen further reacts with the starting isotope compounds $UF_6$ to produce more $UF_5$ and hydrogen fluoride. During the short life of $UF_5$, radiation is now supplied by the dye laser 8 and the compound $U^{235}F_5$ is selectively excited. Only the latter is therefore able to react with the reaction material $H_2$ to form $U^{235}F_4$ as well as hydrogen fluoride and atomic hydrogen. The latter hydrogen again reacts with the starting material $UF_6$, as before, and again reduces the latter to $UF_5$ to form further hydrogen fluoride. Since the isotope compound $U^{238}F_5$ does not react with hydrogen at room temperature and the excitation is confined to the compound $U^{235}F_5$, the end product $UF_4$ contains the enriched uranium isotope 235. With the exception of $UF_5$ and $UF_4$, all the substances used and produced are gaseous and can therefore easily be separated from the former. Also the separation of the $UF_4$ and the $UF_5$, which are solids, is easily accomplished by known methods as previously mentioned.

Figure 3:
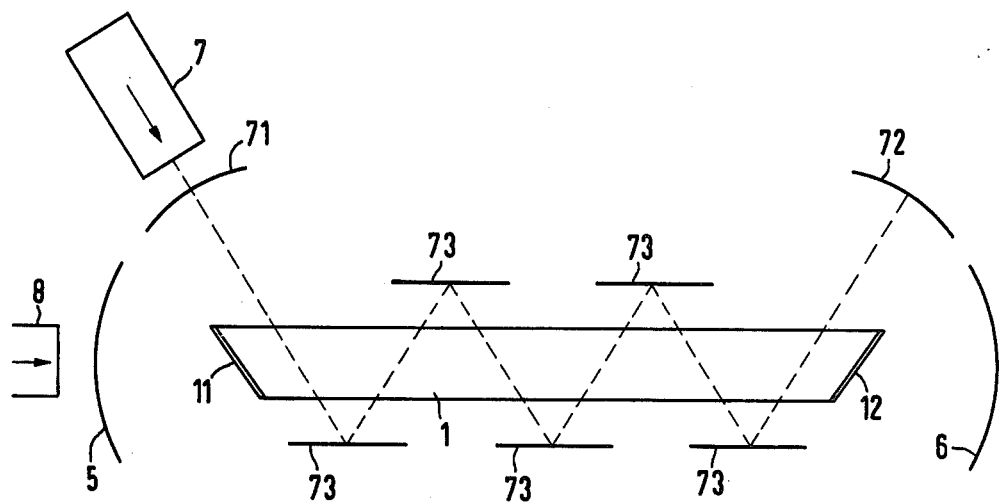
FIG. 3 is a diagrammatic view showing a second laser utilized as the first light source in place of the mercury lamp of FIGS. 1 and 2.
Figure 4:
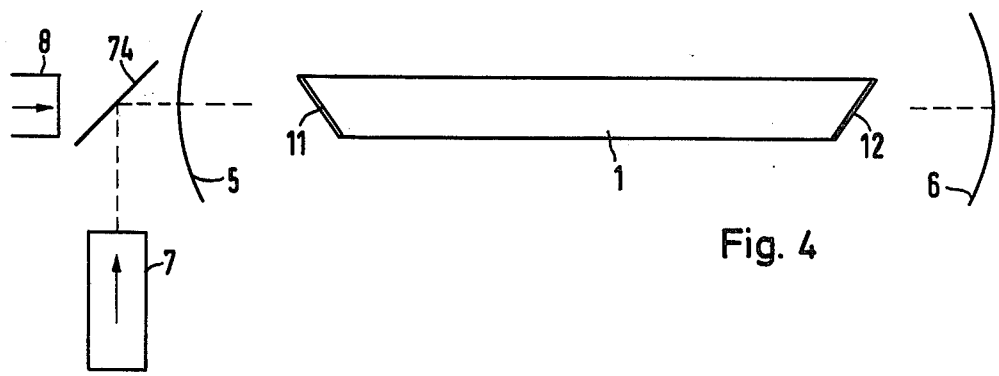
FIG. 4 is another diagrammatic view showing an alternative arrangement for a second laser utilized as the first light source.

FIGS. 3 and 4 show two other variants of the apparatus for carrying out the method according to the invention. According to FIG. 3, a laser 7 is also used as the first source of light, which passes repeatedly through the content of the vessel via mirrors 73 arranged on both sides of the vessel. Here, too, resonator mirrors 71 and 72 are provided in a known manner to increase the efficiency.

In the apparatus according to FIG. 4, the radiation of a laser 7 is again used as the first light source. In this case, the laser beam passes through the reaction vessel 1 by means of the deflection mirror 74 in the direction parallel to the axis, like the beam of the second light source of the laser 8.

In principle, it would be possible to use the two light sources in continuous operation. However, since it is important to obtain radiation energies as large as possible to act on the isotope mixture, it is advantageous to permit the two lamps to act sequentially in a pulsed operation. This also applies in particular to the first light source, which is responsible for the formation of $UF_5$. The higher the short-time concentration of this isotope mixture, the better use can be made of the light of the second radiation source, which is that of the dye laser 8. The duration and spacing of the light pulses may be varied for different reaction rates.

It would, of course, be an additional advantage to tune the frequency of the first light source so that the $UF_6$ is also excited selectively. Even if 100% selectivity cannot be achieved and only the one isotope compound is preferentially excited over the other, an increased yield can be expected.

There are claimed:

1. Method for the separation or enrichment of uranium isotopes which are bound to anisotopic substances and form with the latter a mixture of isotope compounds containing $^{235}UF_6$ and $^{238}UF_6$ which comprises the following steps:
    a. irradiating said mixture of $^{235}UF_6$ and $^{238}UF_6$ compounds in gas or vapor form by a first light source to photochemically convert the isotope compounds to another mixture of isotope compounds containing $^{235}UF_5$ and $^{238}UF_5$ as different isotope compounds,
    b. irradiating said photochemically converted mixture of isotope compounds of $UF_5$ which have only a short life in the nascent gas or vapor phase and condenses to solid stable form, before condensation, by a second light source, at a frequency to selectively excite only one said different $UF_5$ isotope compound of said photochemically converted mixture of isotope compounds,
    c. effecting said excitation in the presence of a reactant which chemically reacts with the excited $UF_5$ compound of the mixture to produce a reaction product, and
    d. separating the reaction products, enriched with one of the starting isotopes.

2. Method according to claim 1, wherein said first and second light sources radiating into the mixture of compounds are pulsed sequentially.

3. Method according to claim 1, wherein irradiation with the first light source is at a frequency to selectively excite one of the isotope compounds and effect a partially selective conversion of the mixture of isotope compounds.

4. Method according to claim 1, wherein said first light source is a laser at a frequency to photochemically convert the isotope compounds to another mixture of isotope compounds without exciting said photochemically converted mixture of isotope compounds.

5. Method according to claim 4, wherein said laser is at a frequency to also selectively excite one of the isotope compounds and effect a partially selective conversion of the mixture of isotope compounds.

6. Method according to claim 1, wherein said mixture of isotope compounds contains $^{235}UF_6$ and $^{238}UF_6$ and $UF_5$ is produced through irradiation with said first light source, splitting off fluorine, and wherein said first light has a wavelength longer than 100 nm and shorter than 500 nm.

7. Method according to claim 6, wherein said first light source is a high-pressure mercury burner.

8. Method according to claim 6, wherein said generated fluorine reacts with and is bound by hydrogen.

9. Apparatus for the separation or enrichment of isotopes which are bound to anisotopic substances and form with the latter a mixture of isotope compounds, which comprises a highly-reflecting elliptical cylinder, a tubular irradiation and reaction vessel disposed at one focal line of said reflecting elliptical cylinder, a high pressure mercury burner as a first light source disposed at the second focal line of said reflecting elliptical cylinder, resonator mirrors of a dye laser as a second light source disposed to irradiate a mixture of isotope compounds in said reaction vessel, an inlet to said reaction vessel for introducing a feed mixture of isotope compounds, an inlet to said reaction vessel for introduction of a reactant, and an outlet for said reaction vessel for the discharge of reaction products.

10. Apparatus according to claim 9, wherein a filter material is interposed between said first light source and said reaction vessel to filter out undesired wavelengths.

11. Apparatus according to claim 10, wherein said filter material is an aqueous solution of salts.

12. Apparatus for the separation or enrichment of isotopes which are bound to anisotopic substances and form with the latter a mixture of isotope compounds, which comprises a tubular irradation and reaction vessel, an inlet to said reaction vessel for introducing a feed mixture of isotope compounds, an inlet to said reaction vessel for introduction of a reactant, an outlet for said reaction vessel for the discharge of reaction products, a laser having a wavelength longer than 100 nm and shorter than 500 nm as a first light source with said light directed through said reaction vessel in the axial direction of the vessel, said first light having a frequency at which only the feed material is excited without exciting the resultant reaction product, and resonator mirrors of a dye laser as a second light source disposed to irradiate, in an axial direction through said reaction vessel, the reaction product produced by irradiation from said first light source.

* * * * *